United States Patent [19]

Hasegawa

[11] Patent Number: 5,276,308
[45] Date of Patent: Jan. 4, 1994

[54] CONTROLLER FOR RESISTANCE WELDING

[75] Inventor: Hiroshi Hasegawa, Aichi, Japan

[73] Assignee: Nadex Co., Ltd., Nagoya, Japan

[21] Appl. No.: 935,398

[22] Filed: Aug. 26, 1992

[30] Foreign Application Priority Data

Jun. 29, 1992 [JP] Japan ............................ 4-196490

[51] Int. Cl.$^5$ ............................................. B23K 11/24
[52] U.S. Cl. .................................................. 219/110
[58] Field of Search .............................. 219/110, 109

[56] References Cited

U.S. PATENT DOCUMENTS

| | | | |
|---|---|---|---|
| 3,546,421 | 12/1970 | Meyer et al. | 219/110 |
| 4,419,560 | 12/1983 | Zurek | 219/110 |
| 4,694,135 | 9/1987 | Nagel et al. | 219/110 |
| 5,083,003 | 1/1992 | Clark, Jr. et al. | 219/110 |

FOREIGN PATENT DOCUMENTS 62-18273  4/1987  Japan .

Primary Examiner—Clifford C. Shaw
Attorney, Agent, or Firm—Dennison, Meserole, Pollack & Scheiner

[57] ABSTRACT

A resistance welding machine includes a circuit for detecting a timing when the time derivative of primary winding current of a welding transformer becomes almost zero. The machine includes a circuit for measuring the primary winding current and primary winding voltage of the welding transformer, when the timing is detected by the timing detecting circuits. There is also for calculating a resistance of a secondary circuit from the primary winding current and y winding voltage measured by the measuring circuit as well as a characteristic value of the welding transformer. The machine includes a circuit for calculating variation of the resistance of the secondary circuit calculated by the calculating circuit in a predetermined period of time, and a circuit for discriminating presence or absence of flash occurrence by comparing the value relating to the variation calculated by the variation calculating circuit with an intermediate value between a value relating to the variation when flash occurs and a value relating to the variation when no flash occurs. Additionally, the machine includes a welding current regulator for comparing the number of flash occurrence discriminated by the discriminating circuit with the number of flash occurrence at optimum welding, and decreasing the welding current if the former is larger than the latter, and increasing the welding current if the former is smaller than the latter.

6 Claims, 7 Drawing Sheets

CONTROLLER FOR RESISTANCE WELDING

BACKGROUND OF THE INVENTION

1. Field of the Invention

The present invention relates to a controller for a welding machine of the type including a welding transformer which has a primary winding circuit and a secondary winding circuit, the secondary winding circuit including a pair of welding electrodes between which a workpiece to be welded is held, supply of welding current to the primary winding circuit causing resistance heating of the workpiece.

2. Description of the Prior Art

In the welding machine of this type, too small welding current cannot provide satisfactory welding, while too large welding current will cause flash or spattering which will disadvantageously degrade appearance of the welded portion. For this purpose, the welding current must be properly regulated. Furthermore, repeated welding operations cause deformation of the welding electrodes, which results in corresponding change of a proper value for the welding current. Therefore, the controller for the welding machine is required to have a function of determining a proper value for the welding current in such a condition and regulating the welding current to the determined value.

In order to perform the above control, measurement of the interelectrode resistance is effective. There has been proposed a technique of regulating the welding current in such a way as to cause predetermined change of the interelectrode resistance. An example of such a technique is described in Japanese Laid-Open Patent Publication No. 62-18273.

In the above prior art, the primary winding current and voltage across the electrodes are measured to derive the interelectrode resistance. It is, then, necessary in the prior art to add a voltmeter between the electrodes. Such addition of the voltmeter between the electrode, however, requires specific machining of a gun holding the electrodes so as to place lead wires. Furthermore, in many cases, such a gun is disposed at an inner portion of a welding jig, resulting in difficulty in maintenance. There often occurs a problem of breaking of the lead wires caused by movement of the gun or a workpiece, or flash generated during welding operation. These problems have limited application of the method of controlling a welding machine through interelectrode resistance to actual production lines.

In such a prior art technique of control based upon the interelectrode resistance, a target value or curve is previously set, and the welding current is controlled so as to be equal to the target. Such control of the welding current to be equal to the target will, however, sometimes fail to provide satisfactory welding due to variations of thickness of the workpiece, thickness of a plated layer of the workpiece or the like.

SUMMARY OF THE INVENTION

It is an object of the present invention to provide a controller which calculates interelectrode resistance without degrading reliability and manipulability and which assures proper welding on the basis of the interelectrode resistance.

According to the present invention, there is provided a resistance welding machine whose concept is diagrammatically shown in FIG. 1 and which comprises means D for detecting a timing when the time derivative of primary winding current of a welding transformer B becomes almost zero, means E for measuring the primary winding current and primary winding voltage of the welding transformer when the timing is detected by the timing detecting means D, means F for calculating a resistance of a secondary winding circuit from the primary winding current and primary winding voltage measured by the measuring means E and a characteristic value of the welding transformer, means G for calculating variation of the resistance calculated by the calculating means F in a predetermined period of time, means H for discriminating presence or absence of flash occurrence by comparing the value relating to the variation calculated by the variation calculating means G with an intermediate value between a value relating to the variation when flash occurs and a value relating to the variation when no flash occurs, and welding current regulating means I for comparing the number of flash occurrence discriminated by the discriminating means H with the number of flash occurrence at optimum welding and decreasing the welding current, if the former is larger than the latter, and increasing the welding current if the former is smaller than the latter.

According to an aspect of the present invention, the secondary winding resistance is calculated by the secondary resistance calculating means F, in which the primary winding current and primary winding voltage are used to calculate the secondary resistance, with no need of adding measuring means to the secondary winding circuit. This is effective to improve reliability, facility of maintenance, without compromising manipulability.

According to another aspect of the present invention, the variation of the secondary resistance is calculated by the means G. The secondary resistance is the total of inner resistance RT of the welding transformer, resistance RC of welding cables, resistance RG of a gun and interelectrode resistance (work resistance) RW, and not necessarily equivalent to the work resistance. RT, RC and RG of the above resistances change little during welding operation, and in comparison with them, only RW greatly changes. Thus, when the variation of the secondary resistance is calculated by the means G, the obtained value is substantially equivalent to the variation of the work resistance RW.

It is known that the work resistance RW is drastically reduced, when flash occurs during welding operation. On the contrary, when no flash occurs, it is slowly reduced. Then, the variation of the work resistance RW can be compared with an intermediate value which is smaller than the large variation produced when flash occurs but larger than the small variation produced when no flash occurs so as to accurately estimate presence or absence of flash. Thus, the means H can accurately discriminate if flash occurs or not.

Optimum welding is achieved by flowing maximum welding current in the range in which no flash occurs. This permits welding to be achieved in the shortest time. But it is known that flow of welding current so large as to cause proper flash will not degrade the appearance of the welding portion but provide proper welding.

On the basis of such recognition, the means I of the invention regulates the welding current in such a manner as to cause an optimum number of flash occurrence. Thus, as the actual number of flash occurrence is controlled to be equal to the optimum number of flash occurrence in the apparatus, proper welding is assured.

DETAILED DESCRIPTION OF THE PREFERRED EMBODIMENT

Figure 1:
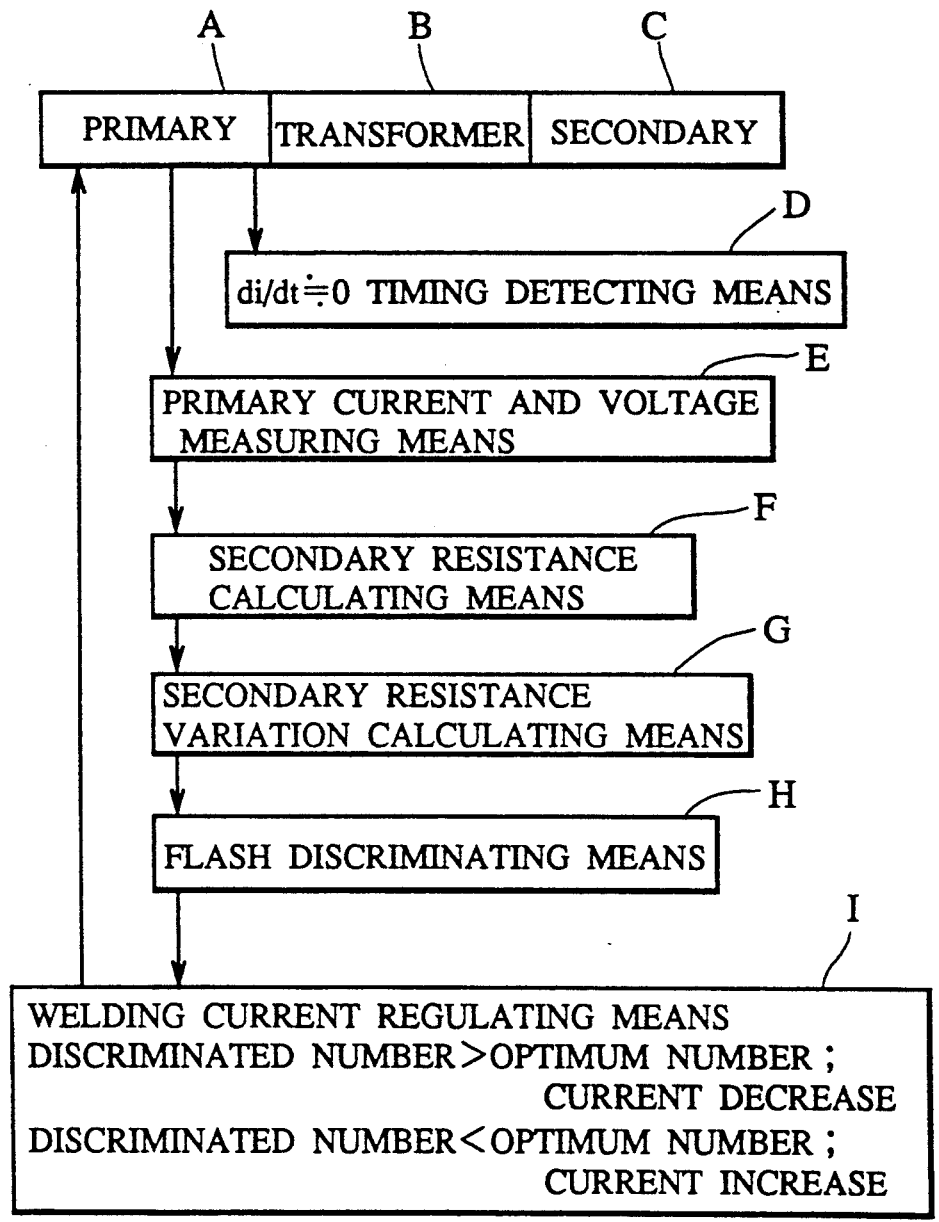
FIG. 1 is a view diagrammatically showing the concept of the present invention.
Figure 2:
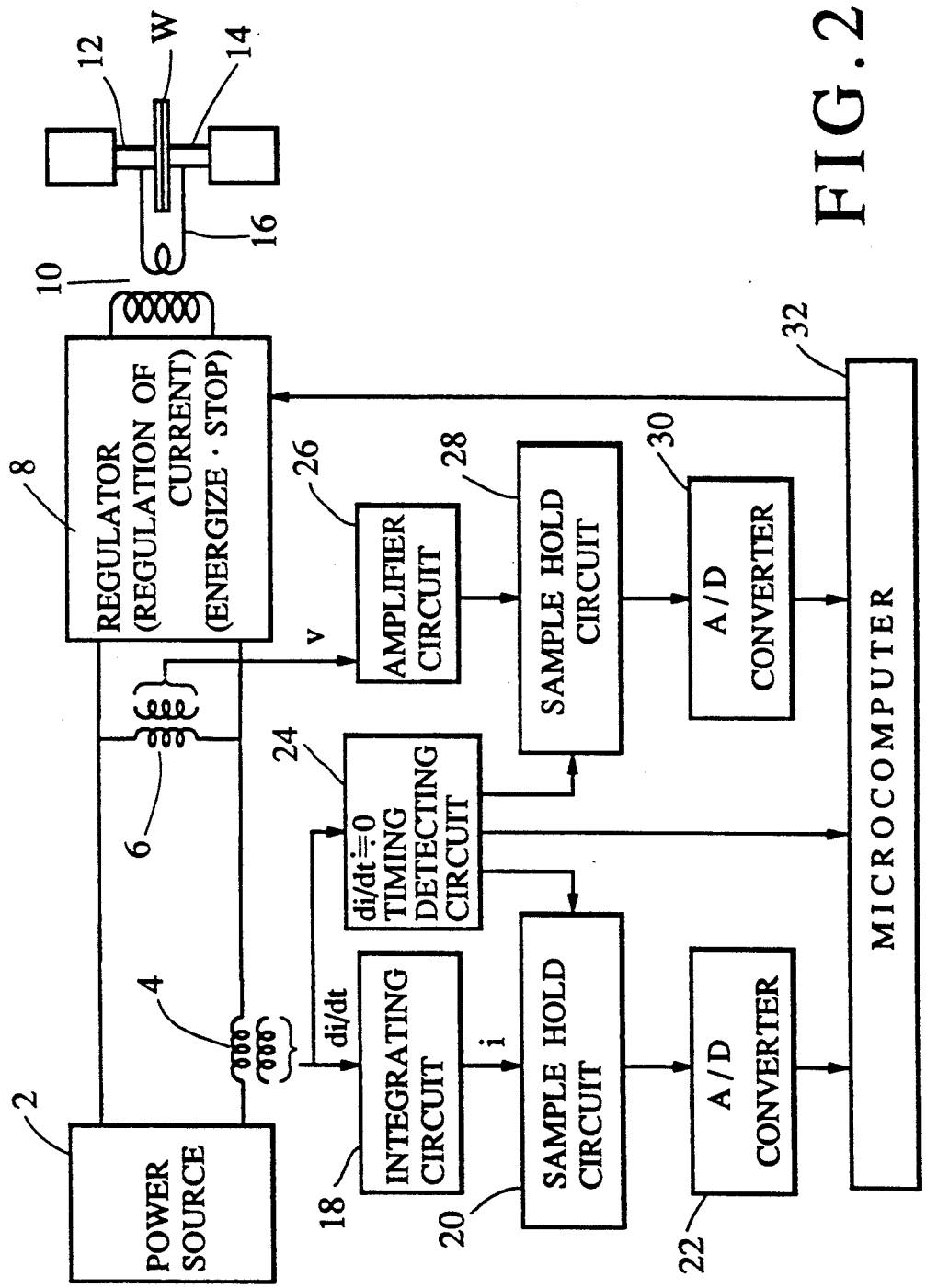
FIG. 2 is a block diagram according to a first embodiment of the present invention.

Now, a first embodiment of the present invention will be described with reference to FIGS. 2 to 7. FIG. 2 shows a general construction of a welding machine incorporating a controller of the first embodiment according to the present invention. In FIG. 2, the machine includes a commercially available power source 2, a welding transformer 10, and a regulator 8 disposed between the welding transformer 10 and the power source 2 and adapted for regulating welding current and switching connection and disconnection of the welding current. The welding transformer 10 includes a primary winding and a secondary winding to which a pair of electrodes 12, 14 are connected through welding cables 16, a workpiece W to be welded being held tightly between the electrodes 12, 14.

An air-core transformer 4 is added in the primary winding circuit of the welding transformer 10 to detect welding current i. The air-core transformer 4 produces a voltage output equivalent to the time derivative di/dt of the welding current i. A step-down transformer 6 is also added in the primary winding circuit of the welding transformer 10, which produces a voltage output corresponding to the primary winding voltage V.

The signal from the transformer 4 for detecting the primary winding current or welding current is transmitted to an integrating circuit 18 and to a circuit 24 adapted for detecting a timing when the time derivative di/dt of the primary winding current becomes almost zero. The integrating circuit 18 integrates the time derivative di/dt of the primary winding current from the transformer 4 and outputs a signal corresponding to the primary winding current i. The timing detecting circuit 24 compares the value outputted from the primary winding current detecting transformer 4 with a value near zero, and outputs an ON signal, when the former is smaller than the latter.

Figure 7:
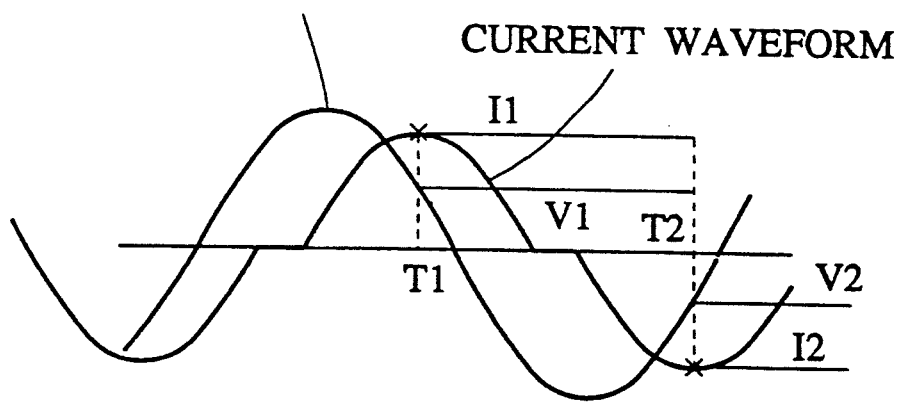
FIG. 7 is a view illustrating the waveforms of current and voltage of the primary winding.

FIG. 7 shows typical waveforms of the primary winding current and voltage, and as shown in FIG. 7, the time derivative di/dt of the primary winding current becomes almost zero every half a cycle. The timing detecting circuit 24 detects the timings T1, T2, and at each of the timings, it produces an ON signal.

The signal from the timing detecting circuit 24 is transmitted to a sample hold circuit 20. The sample hold circuit 20 holds an output value of the integrating circuit 18 when it receives the ON signal from the timing detecting circuit 24. Thus, the output value of the sample hold circuit 20 is held to be I1 between the timings T1 and T2, and it becomes I2 after the timing T2, as shown in FIG. 7. The value is digitalized by an analog-to-digital converter 22 and then transmitted to a microcomputer 32.

The transformer 6 for detecting the primary winding voltage V produces an output which is amplified by an amplifier circuit 26 and then transmitted to a sample hold circuit 28 which also receives a signal from the timing detecting circuit 24. Thus the output value of the sample hold circuit 28 is held to be V1 between the timing T1 and T2, and it changes to V2 at the timing T2. The value is digitalized by an analog-to-digital converter 30 and then transmitted to the microcomputer 32.

The microcomputer 32 performs the process as described later, and, in response to a signal obtained thereby, transmits a control signal to the regulator 8. Thus, the regulator 8 can regulate ON/OFF control of the welding current i and the amperage thereof in accordance with the instruction from the microcomputer 32.

Figure 3:
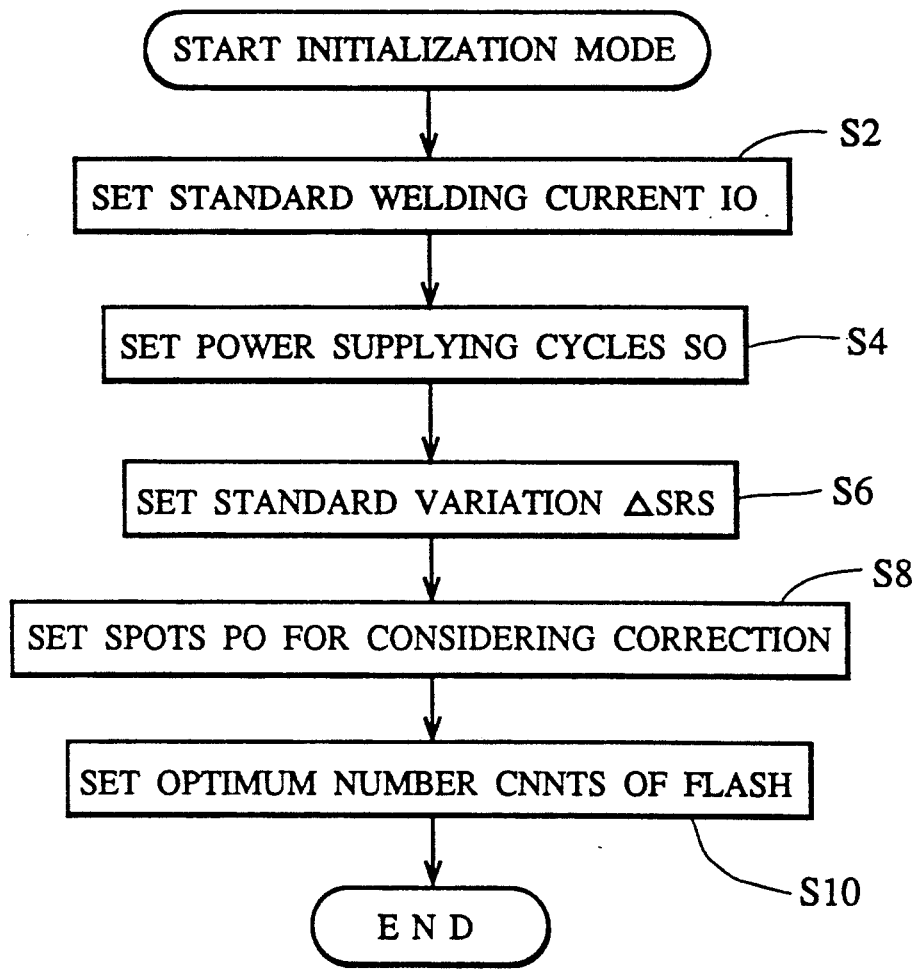
FIG. 3 is a flow chart of the procedure of an initialization mode.

FIG. 3 shows a procedure in an initialization mode. First in Step S2, a standard welding current IO is set and stored. It should be noted here that the standard welding current IO is defined to be an amperage assuring provision of optimum welding when the welding electrodes are kept in a standard configuration and the workpiece W is standard, and it is inputted by an operator on the basis of previously obtained data or the like. Then, in Step S4, power supplying cycles SO is inputted and stored. Here, the power supplying cycles correspond to the period of time in which the welding current flows and it is inputted in the form of the industrial power supply cycles. In an example of FIGS. 5 and 6 which will be mentioned later, 14 cycles are set.

Figure 5:
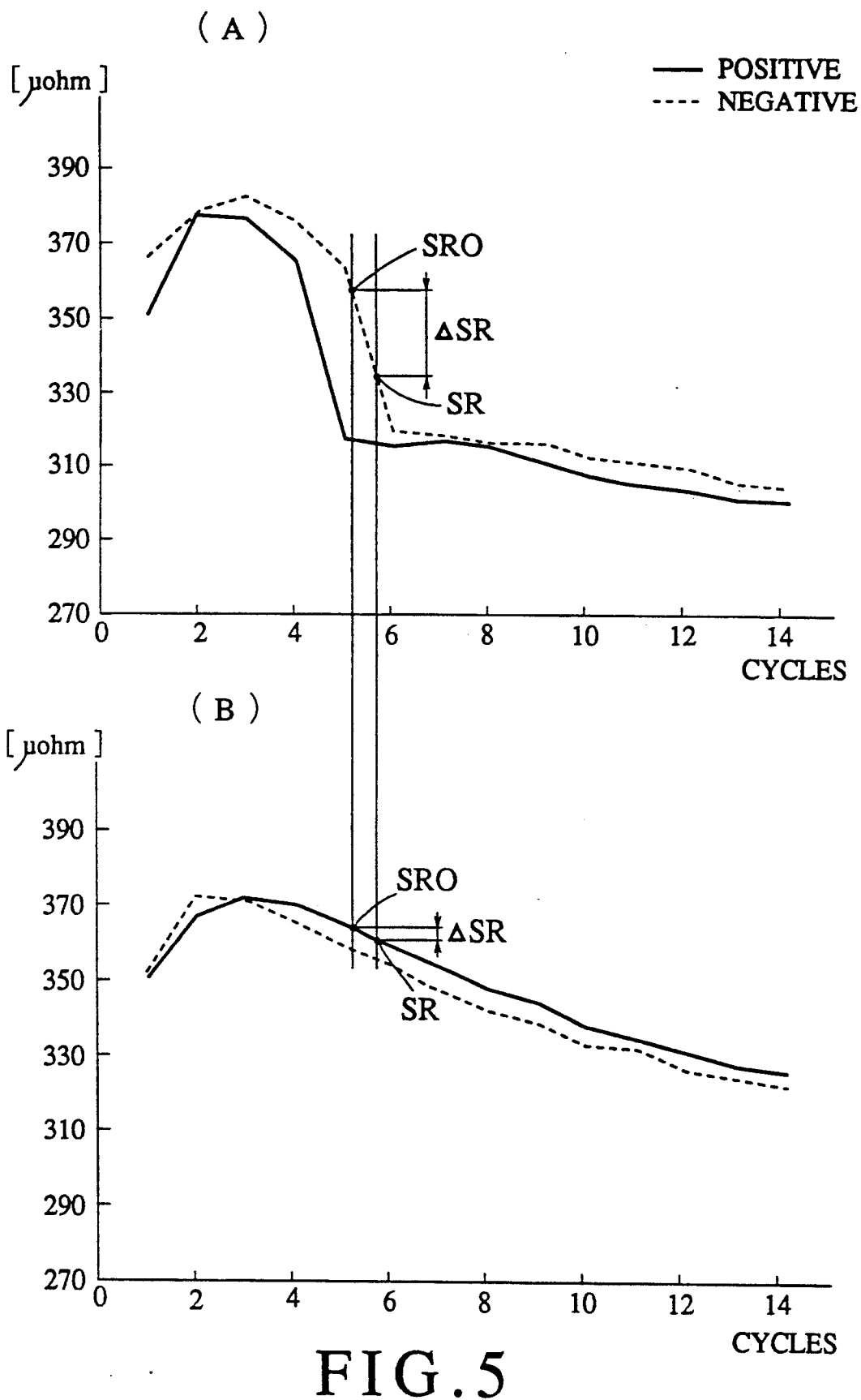
FIG. 5 is a graph illustrating the change in work resistance when flash occurs in comparison with that when no flash occurs.

In Step S6, a standard variation ASRS is inputted. FIG. 5 shows characteristic curves of change in the interelectrode resistance or work resistance during welding operation. At start of the welding operation, the work resistance increases, as the work temperature rises, and it decreases, as the welding operation proceeds. FIG. 5(A) relates to the work resistance when flash or spattering occurs during the welding operation, and, as shown, the work resistance is abruptly lowered. On the contrary, FIG. 5(B) relates to the work resistance when no flash occurs, and the work resistance is slowly lowered. When the variation ASR of the work resistance in a predetermined period of time is derived, the variation ΔSR when flash occurs is large, while the variation ΔSR when no flash occurs is small. The standard variation ΔSRS is defined to be an intermediate value smaller than the variation ΔSR when flash occurs but larger than the variation ΔSR when no flash occurs and inputted in Step S6 in FIG. 3.

In Step S8, the number PO of spots required for considering correction is inputted. Even when the welding current is discriminated to be excessive or in short at a single welding spot of a workpiece, as will be described later, such a discrimination may be caused by difference of the workpiece. Then, it is preferable that the welding current is discriminated to be excessive or in short in average on the basis of previously obtained data and corrected in accordance with the average tendency. In Step S8, the term required for obtaining the average tendency is inputted through the number of spots or the number of welding operations. If the difference between workpieces is relatively large, a longer term is defined, while the difference is relatively small, a shorter term is defined.

In Step S10, an optimum number of flash occurrence CNNTS is inputted and set. It should be noted here that the optimum number of flash occurrence is defined to be the number of flash occurrence which is preferred to occur during the welding operations numbering PO as defined in Step S8. If no flash occurs, the welding current is considered to be too small. On the contrary, if flash occurs too often, the welding current is considered to be too large. In other words, the number of flash occurrence has an optimum, which is inputted in Step S10. The number of flash occurrence in a single welding operation may be inputted.

Figure 4A:
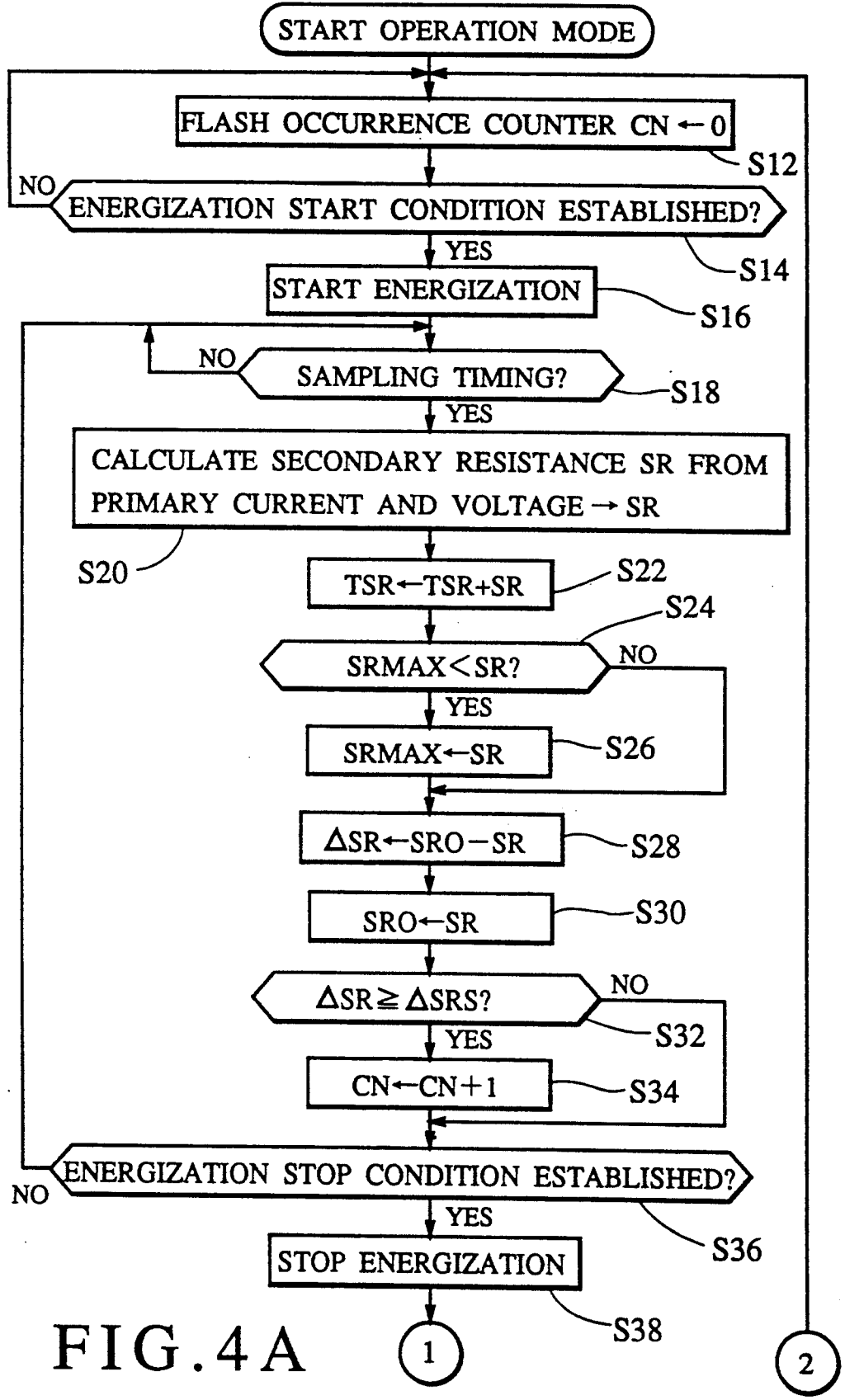
FIGS. 4A and 4B are flow charts of the procedure of an operating mode.
Figure 4B:
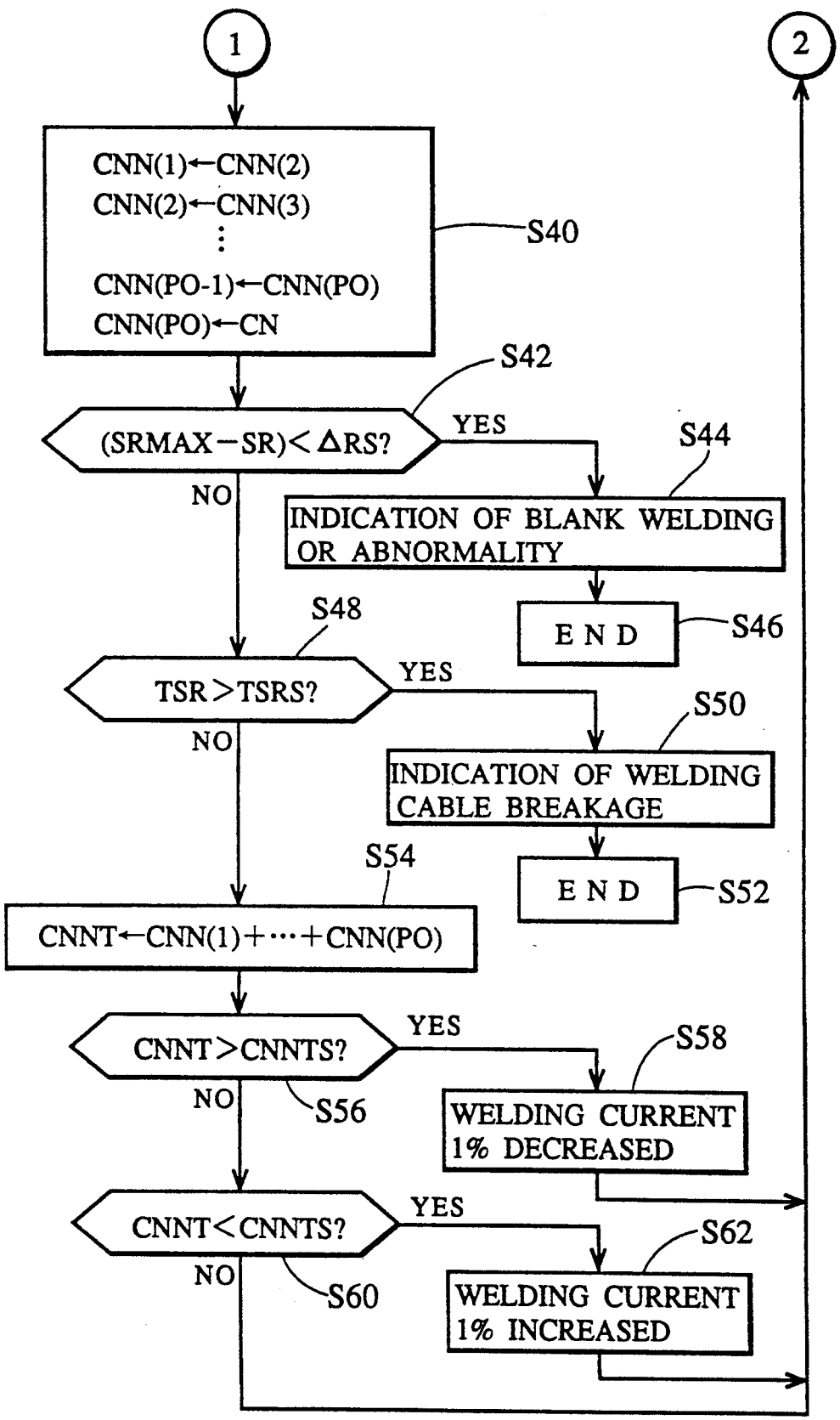

FIGS. 4A and 4B show flow charts of the procedure performed by the microcomputer 32. First in Step S12, the value of a counter CN for counting the number of flash occurrence in a single welding operation is initialized to zero. Then, if it is determined in Step S14 that energization start condition is established, energization is started in Step S16.

Then in Step S18, it is discriminated if it is a sampling timing or not. In this step, the microcomputer 32 discriminates if the ON signal is outputted from the timing detecting circuit 24 or not. As shown in FIG. 7, it discriminates as "yes" every half a cycle in Step S18. Therefore, the process in Step S20 and steps subsequent thereto is performed every half a cycle.

In Step S20, a secondary resistance SR is calculated from the first winding current i and the first winding voltage V and the turn ratio N of the welding transformer 10 and stored. As the value at the timing when the time derivative of the primary winding current is zero is used, there is no need of taking into consideration induced components. Thus, the secondary resistance SR is calculated from the following equation:

$$SR = (V/N)/(i \times N)$$

Figure 6:
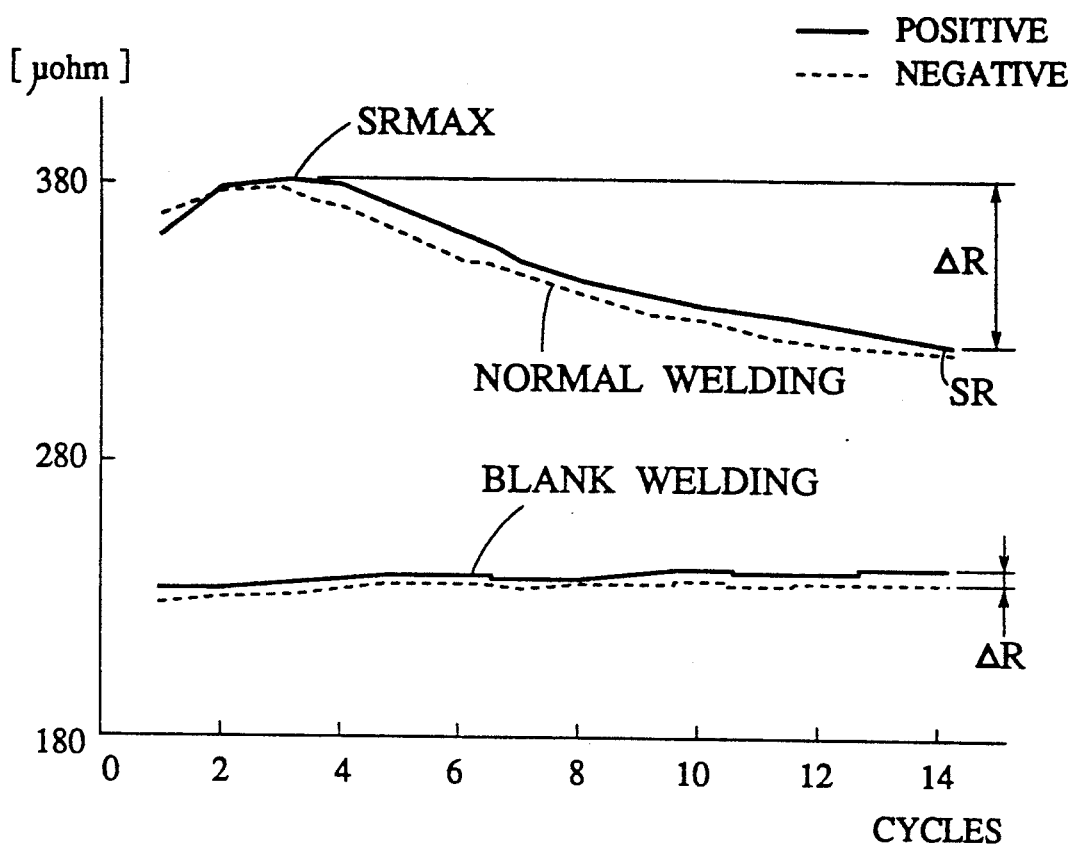
FIG. 6 is a graph illustrating the change in work resistance during normal welding in comparison with that during blank welding.

After the secondary resistance SR is calculated, then in Step S22, the total is calculated to obtain an average of the resistance SR. In Step S24, the resistance SR is compared with the maximum resistance SRMAX that has ever obtained, and if the current resistance SR thus calculated is larger than the maximum resistance SRMAX that has ever obtained, the maximum resistance SRMAX is updated in Step S26. This process is repeated during the welding operation to obtain and store a characteristic curve of the maximum resistance SRMAX in a welding operation as shown in FIG. 6.

In Step S28 in FIG. 4A, the difference between the resistance SRO obtained half a cycle before and the current resistance SR is calculated and stored as ΔSR. Thus, the variation ΔSR as exemplified in FIG. 5(A) and (B) is stored. When the above process is completed, the current value SR is stored in place of the last resistance SRO in Step S30.

In Step S32, the variation ΔSR calculated in Step S28 is compared with the standard variation ΔSRS inputted in Step S6. If the former is larger than the latter, flash is generated. Then, the flash occurrence counter CN is incremented by one in Step S34. On the contrary, if the former is smaller than the latter, no flash is generated. In this case, the process in Step S34 is not performed.

In Step S36, the microprocessor 32 discriminates if the energization stop condition is established or not. If it discriminates as "no", the process from Step S18 downward is repeated. When it discriminates as "yes", energization is stopped in Step S38. When the simple welding operation is completed, the microcomputer 32 discriminates as "yes" in Step S36.

After the single welding operation is completed as described above, the process in Step S40 is performed. In Step S40, the numbers of flash occurrence CNN(L) to CNN(PO) counted in the preceding respective welding operations numbering PO which is set in Step S8 are updated. The value of CN counted in Step S34 is substituted for the last number of flash occurrence CNN(PO). The values CNN(2) to CNN(PO) are respectively substituted for CNN(1) to CNN(PO−1) for update thereof. Thus, the numbers of flash occurrence in the respective welding operations numbering PO preceding to the current welding operation are stored in CNN(L) to CNN(P0).

In Step S42, the difference between the maximum resistance SRMAX and the resistance SR when the welding operations are finished is calculated and compared with ΔRS. It should be noted here that, as shown in FIG. 6, ΔRS is the lowermost value of the resistance variation ΔR when normal welding is carried out. The microprocessor 32 discriminates as "yes" in Step S42, when blank welding is performed, that is, current is supplied to the electrodes directly in contact with each other with no workpiece W interposed therebetween. In such a case, the microprocessor 32 indicates existence of abnormality and terminates the process in Step S46.

In Step S48, the total TSR of the resistances calculated in Step S22 is compared with a predetermined value TSRS. It should be noted here that the total TSR of the resistances is equivalent to an average resistance during the welding operation, and the predetermined value TSRS is determined to be an obtainable maximum average resistance. If the microprocessor 32 discriminates as "yes" in Step S48, it means that the secondary winding resistance is abnormally large due to breakage of the welding cable or others. In such a case, existence of abnormality is indicated in Step S50, and the process is terminated in Step S52. Though the total of resistances equivalent to the average value is used for comparison in Step S48, the average resistance divided by the number of samples may be used.

After the above process, if the welding is normal, control proceeds to Step S54. In Step S54, the total of the numbers of flash occurrence CNN(1) to CNN(PO) generated in the preceding respective welding operations numbering PO is calculated and designated as CNNT and then stored. In Step S56, the total number of flash occurrence CNNT thus obtained is compared with the optimum number of flash occurrence CNNTS set in Step S10. If the former is larger than the latter, the welding current is decreased by 1% in Step S58. On the contrary, if the former is smaller than the latter, or the microcomputer 32 discriminates as "yes" in an Step S60, the welding current is increased by 1% in Step S62. If the former is equal to the latter, Steps S58 and S62 are skipped, and the welding current is maintained. In this way, the welding current in the next welding operation can be regulated. In Step S16 of the next welding operation, the welding current thus regulated flows.

Thus, the welding current is regulated in such a manner as to provide the optimum number of flash occurrence in the subsequent welding operations. This assures proper welding in the subsequent operations. As welding proceeds, the welding electrodes are deformed, but as the number of flash occurrence is maintained at the optimum value, proper welding can be maintained.

It should be noted that, just after the welding electrodes are exchanged, the characteristic of the welding current thus learned is not adaptable, and the microprocessor 32 returns it to the standard welding current set in Step S2 and repeats the learning Steps.

If the optimum number of flash occurrence CNNTS is given as a value corresponding to the number of flash occurrence in a single welding operation, CNNT in the left side in Step S56 must be also converted into the average number of flash occurrence corresponding to a single welding operation to be used for comparison.

In this embodiment, all the data required to obtain the secondary winding resistance is measured in the primary winding circuit. Therefore, there is no need of mounting something forward of the welding cables, with no defection of manipulability and reliability.

The process in Step S42 is effective to detect blank welding, assuring detection of any abnormal operation. Furthermore, the process in Step S48 is effective to detect breakage of cables. Therefore, no measuring means is required in the secondary winding circuit.

The process in Steps S56 to S62 is effective to control the welding current in such a manner that, if the number of flash occurrence is too large during the welding operation, the welding current is decreased, and if the number of flash occurrence is too small, it is increased. This allows the welding current to be regulated to an actual optimum value. Thus, the welding current is controlled in response to the actual number of flash occurrence in this embodiment, which can provide proper welding more positively than by the technique of regulating the work resistance to a target value.

The apparatus of this embodiment includes the means D in which the timing detecting circuit 24 detects a timing when the time derivative $di/dt$ of the primary winding current i becomes almost zero. This is only an example, and the timing when $di/dt$ becomes almost zero may be detected by a program in the microcomputer 32. The apparatus of this embodiment also includes the means in which the values of the sample hold circuits 20, 28 are read by the microcomputer 32 to detect the primary winding current and voltage. This is also only an example, and the sample hold function may be executed by the microcomputer 32.

Further, though the apparatus of the this embodiment includes the means F composed of Step S20 in which the secondary resistance is calculated and the microcomputer 32 which executes the step, such means may be replaced by a hardware.

Though the apparatus of this embodiment includes the means G for calculating the variation of the secondary winding resistance in Step S28, the means H for discriminating presence or absence of flash occurrence in Step S32 and the means I for regulating the welding current in Steps S56 to S62, these means may be, of course, executed in other equivalent procedure.

In this embodiment, the welding current is increased or decreased by 1% in accordance with the number of the flash occurrence. The welding current may be increased or decreased at a rate proportional to the difference between the actual number of flash occurrence and the optimum number of flash occurrence.

In the above embodiment, the means for discriminating presence or absence of flash occurrence (specifically in Step S32 in FIG. 4A) uses the variation $\Delta SR$ of the secondary winding resistance itself for comparison, but other than the variation $\Delta SR$ itself may be used for comparison.

Now, the description will be related to such an embodiment in which, for a value relating to the variation of the secondary winding resistance, a value $\Delta SR/\Delta R$ or the derivative is used, where $\Delta R$ is a value obtained in the left side of Step S42 in FIG. 4B or the difference between the maximum resistance SRMAX and the resistance SR when the welding is finished. In this embodiment, in correspondence with the value $\Delta SR/\Delta R$ to be compared in Step S32 in FIG. 4A, the value in the right side is also changed to a value $\Delta SRS/\Delta R$.

In this embodiment, even when the welding electrodes are deformed and consequently $\Delta R$ is changed, the number of flash occurrence can be accurately counted.

In the process in FIGS. 4A and 4B, $\Delta R$ is not yet derived when Step S32 is executed. But in this embodiment, the values of $\Delta SR$ are sequentially stored before Step S38, and after Step S38 is executed, the stored values of $\Delta SR$ are used to count the number of flash occurrence.

As described above, the present invention is not limited to the technique of directly using $\Delta SR$ but includes the technique of using the corrected value of $\Delta SR$.

In accordance with the present invention, measuring means is required only in the primary winding circuit and not in the secondary winding circuit, permitting substantial improvement of manipulability and reliability.

Further, the present invention uses as an index not the secondary winding resistance itself but the variation thereof, allowing effective data to be obtained from only data of the primary winding circuit.

Furthermore, in accordance with the present invention, the welding current is regulated in such a manner that the actual number of flash occurrence becomes equal to the optimum number thereof, assuring proper welding.

While the invention has been described with reference to a preferred embodiment thereof, it is to be understood that modifications or variations may be easily made without departing from the scope of the present invention which is defined by the appended claims.

What is claimed:

1. A resistance welding machine comprising:
   means for detecting a timing when the time derivative of primary winding current of a welding transformer becomes almost zero;
   means for measuring the primary winding current and primary winding voltage of said welding transformer, when the timing is detected by said timing detecting means;
   means for calculating a resistance of a secondary circuit from the primary winding current and primary winding voltage measured by said measuring means and a characteristic value of said welding transformer;
   means for calculating variation of the resistance of the secondary circuit calculated by said calculating means in a predetermined period of time;
   means for discriminating presence or absence of flash occurrence by comparing the value relating to the variation calculated by said variation calculating means with an intermediate value between a value relating to the variation when flash occurs and a value relating to the variation when no flash occurs; and welding current regulating means for comparing the number of flesh occurrence discriminated by said discriminating means during preceding welding operation of a number predetermined by an operator with the number of flash occurrence at optimum welding, and decreasing the welding current if the former is larger than the latter, and increasing the welding current if the former is smaller than the latter.

2. The resistance welding machine as defined in claim 1, wherein said value relating to the variation used in said means for discriminating presence or absence of flash occurrence is the variation itself.

3. The resistance welding machine as defined in claim 1, wherein said value relating to the variation used in said means for discriminating presence or absence of flash occurrence is a value obtained by dividing the variation by a difference $\Delta R$ between the maximum resistance SRMAX during welding and the resistance SR when welding is finished.

4. The resistance welding machine as defined in claim 1, wherein said timing detecting means comprises an air-core transformer for outputting a voltage equivalent to the time derivative $di/dt$ of the primary winding current.

5. The resistance welding machine as defined in claim 1, wherein said welding current regulating means increases or decreases the welding current by 1%.

6. The resistance welding machine as defined in claim 1, wherein said welding current regulating means increases or decrease the welding current in response to the difference between the discriminated number of flash occurrence and the number of flash occurrence at optimum welding.

* * * * *